United States Patent
Porter et al.

(10) Patent No.: US 6,809,595 B2
(45) Date of Patent: Oct. 26, 2004

(54) METHOD OF MULTIPLEXING COLUMN AMPLIFIERS IN A RESISTIVE BOLOMETER ARRAY

(75) Inventors: Stephen George Porter, Towcester (GB); John Fox, Kislingbury (GB); Bhajan Singh, Handsworth (GB)

(73) Assignee: Infrared Integrated Systems Limited, Towcester (GB)

( * ) Notice: Subject to any disclaimer, the term of this patent is extended or adjusted under 35 U.S.C. 154(b) by 30 days.

(21) Appl. No.: 10/094,910

(22) Filed: Mar. 11, 2002

(65) Prior Publication Data

US 2002/0185602 A1 Dec. 12, 2002

(30) Foreign Application Priority Data

Mar. 12, 2001 (GB) .............................................. 0106010

(51) Int. Cl.[7] .................................................. H03F 3/08
(52) U.S. Cl. ...................................... 330/308; 330/147
(58) Field of Search ........................ 250/214 A, 338.1, 250/338.4, 332; 330/308, 147, 124 R

(56) References Cited

U.S. PATENT DOCUMENTS

| | | | |
|---|---|---|---|
| 3,696,250 A | 10/1972 | Weimer | 250/220 |
| 5,554,849 A | 9/1996 | Gates | 250/370.08 |
| 6,476,859 B1 | 11/2002 | Galloway et al. | 348/164 |
| 6,528,788 B1 | 3/2003 | Galloway | 250/322 |
| 2002/0008202 A1 | 1/2002 | Galloway | 250/338.3 |
| 2002/0043623 A1 | 4/2002 | Galloway | 250/339.02 |
| 2002/0081760 A1 | 6/2002 | Whatmore | 438/25 |
| 2002/0100874 A1 | 8/2002 | Carter et al. | 250/338.5 |
| 2002/0109096 A1 | 8/2002 | Carter | 250/339.15 |
| 2002/0159037 A1 | 10/2002 | Porter et al. | 353/69 |
| 2002/0179838 A1 | 12/2002 | Porter et al. | 250/338.3 |

FOREIGN PATENT DOCUMENTS

| | | | |
|---|---|---|---|
| EP | 0 585 115 A2 | 3/1994 | H03K/17/00 |
| EP | 0 964 571 A2 | 12/1999 | H04N/3/15 |
| WO | WO 88/05984 | 8/1988 | H04N/3/15 |
| WO | WO 94/00950 | 1/1994 | H04N/5/33 |
| WO | WO 97/01926 | 1/1997 | H04N/5/33 |

OTHER PUBLICATIONS

U.S. patent application Ser. No. 09/558,279, Hollock et al, filed Apr. 25, 2000.
European Search Report, Application No. EP 02 25 1754, dated Oct. 31, 2002.

Primary Examiner—Steven J. Mottola
(74) Attorney, Agent, or Firm—Moser, Patterson & Sheridan, L.L.P.

(57) ABSTRACT

A two dimensional array of resistive bolometers (B) is arranged in rows and columns. Amplifiers (A0, A1 etc) amplify signals obtained from the bolometers. Instead of providing one amplifier per column, a smaller number of amplifiers is used each of which is connected to a plurality of column sense lines (L) via a multiplexer (M0, M1 etc).

8 Claims, 1 Drawing Sheet

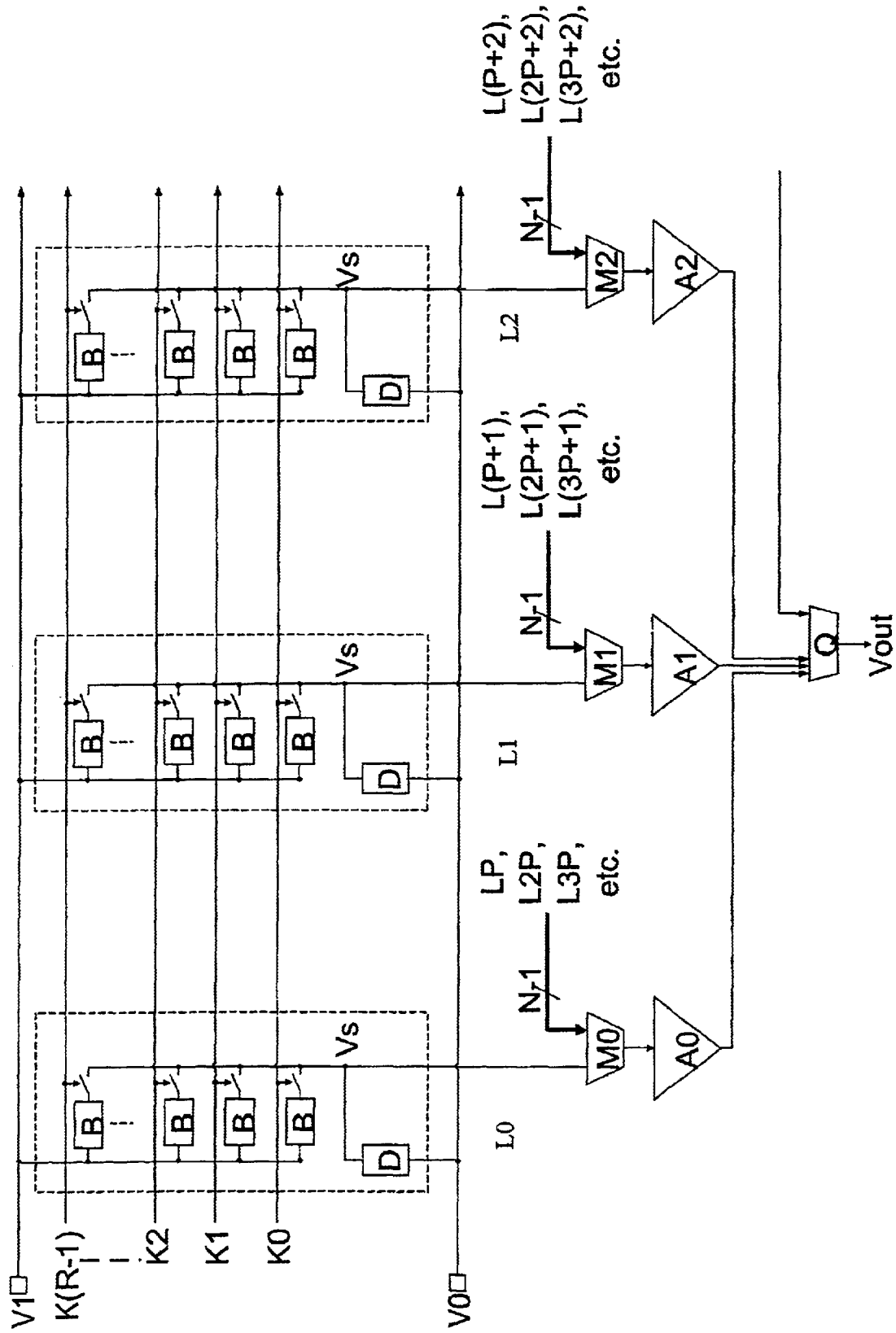

METHOD OF MULTIPLEXING COLUMN AMPLIFIERS IN A RESISTIVE BOLOMETER ARRAY

BACKGROUND OF THE INVENTION

A IR detector array typically comprises a number of rows and columns of detector elements. In a pyroelectric detector array for example, each column of elements of the array is connected to a column amplifier via a common sense line. In such a scheme there is one column amplifier per column of detector elements. In a pyroelectric detector array each element in each row is turned on, and by means of multiplexing (addressing) switches each row element is connected to its corresponding common sense line on a row by row basis.

Such an architecture and addressing approach is commonly used in a resistive bolometer array application. An example is disclosed by B. E. Cole, R. E. Higashi and R. A. Wood, in "Monolithic Two Dimensional Arrays of Micromachined Microstructures for Infrared Applications" Proc. IEEE, 86, 1679–1686, 1998. In this application however, if each element in a row is turned on, a large power consumption may result and this may cause the detector array to operate incorrectly. To reduce the power consumption to a practical limit and so maintain good IR detection performance only a small number of elements may be turned on in each row in turn. In this situation the bolometer array will output signals only onto a small number of column sense lines at any one time. By suitable addressing, the elements in each row which are turned on are moved in a pulsed fashion across the row in such a way that only a constant number of elements is on at any one time. Because only a small number of bolometer elements and hence column sense lines are active at any one time, the column amplifiers connected to the column sense lines that are not active are redundant and consume unnecessary power. It would therefore be advantageous to use fewer column amplifiers.

SUMMARY OF THE INVENTION

The present invention provides a two dimensional array of resistive bolometers arranged in rows and columns having a plurality of amplifiers for amplifying signals obtained from the bolometers wherein the number of amplifiers is less than the number of columns and the elements of a column are connected to a column sense line and a plurality of column sense lines are connected to each amplifier via a respective multiplexer for each amplifier.

BRIEF DESCRIPTION OF THE DRAWINGS

FIG. 1 is a schematic drawing of an exemplary two dimensional array of bolometers.

DETAILED DESCRIPTION OF THE PREFERRED EMBODIMENT

Preferably, each multiplexer has an equal number of column sense lines connected to it, preferably arranged such that the columns connected to each amplifier are separated by a number of columns equal to the number of amplifiers. Thus, if there are five amplifiers, the fifth amplifier has every fifth column sense line connected to it.

Preferably, as with the prior art arrangement described above, the elements in each row which are turned on at any time are moved in a pulsed fashion across the row in such a way that a constant number of elements is connected to the amplifiers at any time. This can be achieved by arranging the multiplexers to connect sequential groups of adjacent column sense lines to the amplifiers. Thus, for example, with four amplifiers the first group of four adjacent column sense lines are connected to the amplifiers, then the next group of four are connected in the sequence shown in the table below and so on until the first four are connected again.

| Amplifier | A | B | C | D |
|---|---|---|---|---|
| Column sense line connection sequence | 1 | 2 | 3 | 4 |
| | 5 | 2 | 3 | 4 |
| | 5 | 6 | 3 | 4 |
| | 5 | 6 | 7 | 4 |
| | 5 | 6 | 7 | 8 |
| | 9 | 6 | 7 | 8 |

Preferably additional switching means are provided for connecting elements of the column sense lines one at a time, e.g. on a row by row basis. An embodiment of the invention will now be described by way of example only and with reference to the accompanying diagram which shows an array of bolometers B arranged in R rows and C columns with individual switches for connecting the bolometers to common column sense lines L0, L1, L2, . . . L(C-1). Only three columns are shown for simplicity. The bolometers are arranged in a potential divider configuration with a reference resistor D, between power supplies V0 and V1, to provide a voltage signal Vs for each column. The switches are controlled by signals on common row lines K0, K1, K2 . . . K(R-1).

The sense lines L0, L1, L2 etc are connected to column amplifiers A0, A1, A2 etc.

Instead of one amplifier per column, only P column amplifiers are used, where P<<C. In the implementation each column amplifier includes an N:1 input multiplexer M0, M1, M2 etc, where each multiplexer is connected to N active column sense lines L0, LP, L2P, etc at any one time. The value of N is chosen such that P×N=C. For ease of design, typically, N=$2^n$, where n is integer. The number of row elements on at any one time is preferably P, but may be less than P if convenient.

In the preferred arrangement, at the beginning of an array readout, the P column amplifiers are connected to P column sense lines in a defined arrangement. For example, the first column amplifier, A0, is connected via an N:1 multiplexer M0 to column sense lines L0, LP, L2P, etc. The second column amplifier, A1, is connected via an N:1 multiplexer M1 to column sense lines L1, L(P+1), L(2P+1), etc. In an example operation of the bolometer array P adjacent bolometer elements in each row would be turned on by suitable addressing to multiplexers M0, M1, M2, etc As each row element in the array is addressed and read out one of the N:1 multiplexers increments to the next column sense line. Thus to complete a row readout, each of the multiplexers will circulate once through its N inputs.

Outputs from the P amplifiers are connected to a P:1 multiplexer Q to provide a readout Vout.

By way of example, the invention will be described as applied to an array of 96 rows and 128 columns using 8 column amplifiers. At the beginning of an array readout the first row is selected and the 8 amplifiers are connected to the first 8 columns. Amplifier 1 is then switched to column 9, then amplifier 2 is switched to column 10, and so on until all 128 elements of row 1 have been addressed in turn. The process is then repeated for the second row, and so on until the whole array has been addressed. During this operation the 8 elements being addressed at any one time may be switched on, or a smaller number, such as 6, may be switched on so as to reduce the power consumption and the total time each element is on (i.e. passing current through the bolometer element).

It will be appreciated from the foregoing that the example described has the following features/advantages:

A multiplexed column amplifier scheme that significantly reduces the number of column amplifiers in a pulsed addressed resistive bolometer array.

The reduced number of column amplifiers reduces the resistive bolometer die area and power consumption.

The multiplexing scheme is incorporated into a standard bolometer array addressing scheme.

Reduced number of column amplifiers allows flexibility for increasing the column amplifier area to reduce 1/f low frequency noise, and increased power to reduce wideband thermal noise.

Reduced parametric spreads because less column amplifiers.

Simplified, i.e. reduced column amplifier multiplexing for a single channel output (in reality output multiplex has been reduced into two parts: one at the column amplifier input, and one at the column amplifier output).

What is claimed is:

1. A two dimensional array of resistive bolometers arranged in rows and columns having a plurality of amplifiers for amplifying signals obtained from the bolometers wherein the number of amplifiers is less than the number of columns, and the elements of a column are connected to a column sense line and a plurality of column sense line are connected to each amplifier via a respective multiplexer for each amplifier, wherein each multiplexer has an equal number of column sense lines connected to it, and the column sense lines connected to each amplifier are separated by a number of columns equal to the number of amplifiers.

2. An array as claimed in claim 1, in which the multiplexers are arranged to connect to the amplifiers sequential groups of adjacent column sense lines.

3. An array as claimed in claim 1 having additional switching means for connecting elements of the columns to the column sense lines one at a time.

4. An array as claimed in claim 3 in which the column elements are connected to the column sense lines on a row by row basis.

5. A two dimensional array of resistive bolometers arranged in rows and columns having a plurality of amplifiers for amplifying signals obtained from the bolometers wherein the number of amplifiers is less than the number of columns, and the resistive bolometers of a column are connected to a column sense line and a plurality of column sense lines are connected to each amplifier via a respective multiplexer for each amplifier, wherein each multiplexer has an equal number of column sense lines connected to it; and the multiplexers and column sense lines are arranged such that if the columns are numbered consecutively according to their physical locations, the difference between successive column numbers for columns connected to the same amplifier equals the number of amplifiers.

6. An array as claimed in claim 5, wherein the multiplexers are arranged to connect to the amplifiers sequential groups of adjacent column sense lines.

7. An array as claimed in claim 5, further comprising additional switching means for connecting elements of the columns to the column sense lines one at a time.

8. An array as claimed in claim 7, wherein the column elements are connected to the column sense lines on a row by row basis.

* * * * *

UNITED STATES PATENT AND TRADEMARK OFFICE
CERTIFICATE OF CORRECTION

PATENT NO. : 6,809,595 B2
DATED : October 26, 2004
INVENTOR(S) : Stephen George Porter et al.

It is certified that error appears in the above-identified patent and that said Letters Patent is hereby corrected as shown below:

Title page,
Item [56], References Cited, U.S. PATENT DOCUMENTS, insert:
-- 4,797,560  01/1989 Berger et al...............250/578;
   6,239,433  05/2001 Porter......................250/338.3;
   6,239,698  05/2001 Porter et al...............340/506;
   6,329,656  12/2001 Whatmore...............250/338.2;
   6,028,309  02/2000 Parrish et al...............250/338.1;
   5,586,114  12/1996 Uhling et al...............330/147 --.

Signed and Sealed this

Sixth Day of September, 2005

JON W. DUDAS
*Director of the United States Patent and Trademark Office*